(12) United States Patent
Bindzus et al.

(10) Patent No.: US 6,365,002 B1
(45) Date of Patent: Apr. 2, 2002

(54) AMPHOTERIC STARCHES USED IN PAPERMAKING

(75) Inventors: Wolfgang Bindzus; Paul A. Altieri, both of Belle Mead, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/633,755

(22) Filed: Aug. 7, 2000

(51) Int. Cl.$^7$ ................................................ D21H 17/28
(52) U.S. Cl. .................................... 162/175; 106/206.1
(58) Field of Search ....................... 162/175; 106/206.1, 106/207.1, 207.3, 207.4; 536/102, 108, 109, 55.3, 49

(56) References Cited

U.S. PATENT DOCUMENTS

| 4,166,173 A | * | 8/1979 | Wurzburg et al. | 536/109 |
| 4,216,310 A | * | 8/1980 | Wurzburg et al. | 536/109 |
| 4,876,336 A | * | 10/1989 | Solarek et al. | 536/109 |

OTHER PUBLICATIONS

U.S. application No. 09/633,832, Bindzus et al., filed Aug. 7, 2000.

* cited by examiner

*Primary Examiner*—Peter Chin
(74) *Attorney, Agent, or Firm*—Laurelee Duncan, Esq.; Eugene Zagarella, Jr.

(57) ABSTRACT

The use in papermaking of an amphoteric starch additive which contains a phosphate functional group and is made under anhydrous conditions while in a fluidized state, provides advantageous paper properties and improved wet end performance.

21 Claims, No Drawings

AMPHOTERIC STARCHES USED IN PAPERMAKING

BACKGROUND OF THE INVENTION

This invention relates to a process of papermaking wherein amphoteric starch containing a phosphate component and made by a select process is added to the wet end of the papermaking system to provide paper with good drainage and other improved properties.

The term "paper" as used herein, includes sheet-like masses and molded products made from fibrous cellulosic material, which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that the water is removed, thereby forming a sheet of the consolidated fibers, which upon pressing and drying can be processed into dry roll or sheet form. Two well known papermaking processes involve the Fourdrinier machine, the most common, and the cylinder machine. In the Fourdrinier and multicylinder operations, and in other machine operations, as typical in papermaking, the feed or inlet to the machine is an aqueous slurry or water suspension of pulp fibers which is provided from what is called the "wet end" system. In the wet end, the pulp along with other additives are mixed in an aqueous slurry and subject to mechanical and other operations such as beating and refining to improve interfiber bonding and other physical properties of the finished sheet. Additives commonly introduced along with the pulp fibers are pigments such as titanium dioxide, mineral fillers such as clay and calcium carbonate and other materials introduced into paper to achieve such properties as improved brightness, opacity, smoothness, ink receptivity, fire retardance, water resistance, increased bulk, etc.

It has been known to add various materials, including starch, to the pulp, or stock in the papermaking process or prior to the formation of the sheet, to aid in retention, drainage and strength properties.

Starch has been used in the paper industry for many years and, in fact, is the second largest volume raw material component in paper. Starches perform a number of functions in papermaking including strength improvement, increased drainage and increased retention of fibers, fines and other components on the wire. Both unmodified and modified types of starch have been used.

Anionic and cationic starches as well as amphoteric starches have long been used as additives in papermaking for their contributions to strength and pigment retention in the paper. See, for example, U.S. Pat. No. 3,459,632 issued to C. Caldwell et al. on Aug. 5, 1969 and U.S. Pat. No. 3,562,102 issued to K. Moser et al. on Feb. 9, 1971. More recent patents involving the use of starches in papermaking include U.S. Pat. No. 4,876,336 issued to D. Solarek et al. on Oct. 24, 1989 and which discloses the use of amphoteric starch derivatives and U.S. Pat. No. 5,129,989 issued to S. Gosset et al. on Jul. 14, 1992 which discloses the use of cationic and anionic starches in separate additions.

While starch additives of the prior art have shown favorable effects in improving paper properties, it has been found that the use of amphoteric starch additives, prepared as described herein, have high levels of phosphorus substitution, maintain high viscosities, minimize residual salts and other impurites and improve the wet end performance in papermaking operations.

SUMMARY OF THE INVENTION

Now it has been found that the use in papermaking of an amphoteric starch additive which contains a phosphate component and which is made under anhydrous conditions while in a fluidized state, provides advantageous paper properties and improved wet end performance.

More particularly, this invention involves the process of making paper comprising adding to the paper stock prior to or during formation of the sheet, an effective amount of an amphoteric starch which contains a cationic component and an anionic phosphate component and is made by;

a) impregnating a cationic starch with a phosphate reagent to form an impregnated starch;

b) drying the impregnated starch to substantially anhydrous conditions; and c) heating to phosphorylate the starch.

A preferred embodiment involves the above process wherein the drying and phosphorylation take place in the fluidized state.

DETAILED DESCRIPTION OF THE INVENTION

This invention involves the use of specially prepared amphoteric starches in papermaking. The use of amphoteric starch additives in papermaking has long been known, as noted above, however, amphoteric starches containing a phosphate component and specifically prepared as described herein, have improved characteristics which make them especially useful in papermaking. These amphoteric starches are prepared in a process that has improved reaction efficiency and provides a product with high levels of substitution, particularly bound phosphorus, and minimum amounts of residual salts and other impurities. Such products are also characterized by improved properties such as viscosity, color and uniformity and have been found especially useful as wet end additives in papermaking.

The amphoteric starches as used in this invention contain a cationic functional group and an anionic phosphate functional group and are prepared by impregnating a cationic starch with phosphate and then drying it to substantially anhydrous conditions, preferably when in the fluidized state, before heat treating to effect phosphorylation. By anhydrous or substantially anhydrous conditions is meant less than about 1% moisture content by weight, based on the dry weight of starch. It is preferred that both the drying and phosphorylation steps take place in the fluidized state. While other drying and phosphorylating systems may be used which are not in the fluidized state, the fluidized state is preferred because it provides excellent heat and mass transfer which results in good and desired drying and reaction characteristics.

Impregnation by the phosphate reagent may be accomplished by adding the reagent, at a level of less than about 15% and preferably less than about 10% by weight of starch, either in the dry state or to the wet starch, or by dissolving the reagent in water to form an aqueous solution which is then mixed with the starch. These impregnation techniques are described in U.S. Pat. No. 4,166,173 issued Aug. 28, 1979 to O. Wurzburg et al. and U.S. Pat. No. 4,216,310 issued Aug. 5, 1980 to O. Wurzburg et al., both of which are incorporated herein by reference.

The impregnated starch is first subjected to the fluidized state and dried to anhydrous conditions of less than about 1% by weight moisture content, based on the weight of dry starch, at less than about 140° C., more particularly between about 60 to 140° C. and preferably between about 100 to 125° C. The dried product, while still in the fluidized state, is heated to between about 100 to 185° C., preferably between about 120 to 140° C. for about 30 to 300 minutes. At temperatures higher than about 150° C., the processing time is preferably less than about 45 minutes. Though the heat treatment may be carried out in one step, it is preferably carried out in two steps. When using a one step procedure, once reaction temperature is reached, anhydrous conditions have already or substantially been reached. The important point is that in either the one or two step operation, anhydrous conditions are reached before or in the very early stage of phosphorylation.

The fluidized state is achieved by vigorous mixing of the solid starch particles in vacuum or in a gas whereby a uniform distribution of starch throughout the vacuum or gas may be attained. Vigorous mixing may be accomplished by using air or gas, at or above atmospheric pressures in a fluidized bed reactor or by sufficient mechanical agitation. Where pressurized gas is used to effect the fluidized state, the velocity of the gas must achieve a minimum rate such that the particles are free to move and exhibit a "fluidized state". The fluidized state results in very efficient heat transfer and allows the starch to rapidly dry to a virtually anhydrous state at low temperature.

The phosphate esters prepared by predrying to anhydrous conditions while in the fluidized state as described above are characterized by improved purity as the high reaction efficiency provides a product with a high level of substitution while providing a low level of residual inorganic phosphate salts in the final amphoteric starch product. Further, the process minimizes side reactions such as starch hydrolysis and crosslinking. Such products are also characterized by improved viscosity, color and uniformity. The new process also preserves the granular integrity of the starch, advantageously allowing the optional washing of the final product.

The amphoteric starch prepared as described above using anhydrous conditions and the fluidized state involves a process having improved reaction efficiency. Reaction efficiency is defined to be the amount of bound phosphorus divided by the total amount of phosphorus used in the process, multiplied by 100. Reaction efficiencies of this process may be as high as about 70 to 85% or more, and are much improved over the reaction efficiency of traditional methods of phosphorylating starches.

The process of preparing starch phosphates and cationically modified starch phosphates (amphoteric starches) by impregnating starch and cationic starch with a phosphate reagent and then drying to anhydrous conditions while in a fluidized state prior to heat treating is described in further detail in co-pending U.S. application Ser. No. 09/633,832 filed Aug. 7, 2000, entitled "Improved Starch Phosphate Ester Composition, Process and Method of Use in Food", with Wolfgang Bindzus et al. as inventors. The process, details of this process and compositions as described in U.S. application Ser. No. 09/633,832 are hereby incorporated herein by reference.

The starch which may be used as the base material in preparing the amphoteric starch materials of this invention may be derived from any plant source including corn, potato, wheat, rice, tapioca, sago, sorghum, waxy varieties such as waxy maize and waxy rice, and high amylose varieties such as high amylose corn. Starch flours may also be used. Preferred starches are waxy maize, corn, tapioca, potato starch and combinations thereof. The term "waxy" as used herein is intended to include a starch or flour containing at least about 95% by weight of amylopectin and the term "high amylose" is intended to include a starch or flour containing at least about 40% by weight of amylose, preferably at least about 65% by weight of amylose.

Also included as the base starch material are the conversion products derived from any of the former bases including, for example, dextrins prepared by hydrolytic action of acid and/or heat; oxidized starches prepared by treatment with oxidants such as sodium hypochlorite; fluidity or thin-boiling starches prepared by enzyme conversion or mild acid hydrolysis; derivatized or modified starches; and crosslinked starches. The starch base may be granular or a gelatinized starch, i.e. non-granular starch.

The amphoteric starches as used in this invention contain both a cationic functional group and an anionic functional group. Cationization of the starch which typically is done before phosphorylation is performed by well known chemical reactions with reagents containing amino, imino, ammonium, sulfonium and phosphonium groups as disclosed, for example, in "Cationic Starches" by D. B. Solarek in *Modified Starches: Properties and Uses*, Chapter 8, 1986, pp. 113–129 and in U.S. Pat. No. 4,119,487 issued Oct. 10, 1978 to M. Tessler. Such cationic derivatives include those containing nitrogen groups comprising primary, secondary, tertiary and quaternary amines and sulfonium and phosphonium groups attached through either ether or ester linkages. The preferred cationic derivatives are those containing the tertiary amino and quaternary ammonium ether groups.

The general method for preparing starches containing tertiary amine groups, which method involves reacting starch under alkaline conditions with a dialkylaminoalkyl halide is described in U.S. Pat. No. 2,813,093 issued on Nov. 12, 1957 to C. Caldwell, et al.. Another method is disclosed in U.S. Pat. No. 4,675,394 issued on Jan. 23, 1987 to D. Solarek et al.. The primary and secondary amine starches may be prepared by reacting the starch aminoalkyl anhydrides, amino epoxides or halides, or the corresponding compounds containing aryl in addition to the alkyl groups.

Quaternary ammonium groups may be introduced into the starch by suitable treatment of the tertiary aminoalkyl ether or starch, as described in the previously noted U.S. Pat. No. 2,813,093. Alternatively, quaternary groups may be introduced directly into the starch by treatment with the reaction product of an epihalohydrin and a tertiary amine or tertiary amine salt, to provide, for example, (3-trimethylammonium chloride)-2-hydroxypropyl ether substituent groups as disclosed in the noted U.S. Pat. No. 4,119,487. The above noted patents, i.e., '487, '093 and '394 are incorporated by herein by reference.

The preparation of cationic sulfonium derivatives is described in U.S. Pat. No. 2,989,520 issued June, 1961 to M. Rutenberg et al., and essentially involves the reaction of starch in an aqueous alkaline medium with a beta-halogenoalkylsulfonium salt, vinylsulfonium salt or epoxyalkylsulfonium salt. The preparation of cationic phosphonium derivatives is disclosed in U.S. Pat. No. 3,077,469 issued Feb. 12, 1963 to A. Aszalos and involves reaction of starch in an aqueous alkaline medium with a beta-halogenoalkylphosphonium salt.

Other suitable cationic salts may be provided using reagents and methods that are well known in the art as illustrated in the above references. Further description of useful cationic starches are disclosed in U.S. Pat. No. 2,876,217 issued Mar. 3, 1959 to E. Paschall, U.S. Pat. No. 2,970,140 issued Jan. 31, 1961 to C. Hullinger et al., U.S. Pat. No. 5,004,808 issued Apr. 2, 1991 to M. Yalpani et al., U.S. Pat. No. 5,093,159 issued Mar. 3, 1992 to J. Fernandez et al., and EP 406 837 published Jan. 1, 1991 (corresponding to U.S. application Ser. No. 516,024 filed Apr. 26, 1990), all of which are incorporated herein by reference. Particularly useful cationic derivatives are those containing amino or nitrogen groups having alkyl, aryl, aralkyl or cyclic substituents of up to 18 carbon atoms and especially alkyl of 1 to 6 carbon atoms.

The amount of cationic substituent on the starch can be varied and generally a degree of substitution (DS) of from about 0.003 to 0.2 and preferably from about 0.01 to 0.1 will be used. While larger amounts of cationic substituents or higher degrees of substitution (DS) could be used, they are more costly and difficult to make and therefore not economically attractive. The term "degree of substitution" as used herein, means the average number of sites or substituent groups per anhydroglucose unit of the starch molecule.

The anionic phosphate component of the amphoteric starch is obtained by impregnating the cationic starch with phosphate reagent and then drying and heat treating as described above. "Phosphate reagent" as used herein is defined as any phosphate reagent used for phosphorylating starch including ortho-, pyro-, meta- or tripolyphosphates. Illustrative phosphate reagents are the alkali metal phosphates such as sodium and potassium ortho-phosphate, phosphoric acid, phosphorus oxychloride, sodium and potassium tripolyphosphate and sodium and potassium trimetaphosphate. The reagent may be either a mono-, di- or trialkyl metal phosphate or combinations thereof.

Techniques for phosphorylating a starch base are further described in U.S. Pat. No. 2,824,870 issued Feb. 25, 1959 to H. Neukom and U.S. Pat. No. 2,961,440 issued Nov. 22, 1960 to R. Kerr. These patents disclose techniques of heat reacting starch impregnated with a phosphate salt of an alkali metal, within a prescribed pH range. Previously noted U.S. Pat. 3,562,103 directed to starches containing anionic phosphate groups, discloses a method of phosphorylating starch which comprises forming an aqueous starch slurry at room temperature and adding a suitable concentration of phosphate reagent. Preferably, the pH is adjusted to between 4 and 6, although it is stated that a range of 4 to 11.5 may be used. The starch is filtered without washing and adjusted to a moisture level of about 20% or below, preferably from about 5 to 20% by weight, based on weight of dry starch, at a temperature of less than about 70° C. The starch phosphate composition is then heated at a temperature of 100 to 160° C. until the product has the desired level of anionic phosphate groups. The above noted '870, '440 and '103 patents are all incorporated by reference.

In U.S. Pat. No. 4,166,173 issued Aug. 28, 1979 to O. B. Wurzburg et al., which disclosure is incorporated herein by reference, starch is phosphorylated by an improved pollution-free process which involves forming a concentrated reagent solution of alkali tripolyphosphate salt and impregnating therewith a starch cake containing no more than 45% by weight of moisture. Drying and thermally reacting the thus impregnated starch provides the phosphorylated starch. In preparing the concentrated reagent solution, during addition of the tripolyphosphate salt to the water, one or more acids are added to control the pH at between 2.8 and 5.0.

The amount of phosphorylating reagent used will depend on the reagent and is selected so that the resultant starch derivative contains about 0.03 to 1.0% of bound phosporus and preferably about 0.1 to 0.5%. By the term "bound phosphorus" we mean phosphorus which is attached by an ester linkage to a hydroxyl group of the anhydroglucose backbone of the derivatized starch. Bound phosphorus may also be defined as the phosphorus that cannot be removed from the product by conventional washing or separation techniques.

Most commonly, the amount of phosphorylating reagent employed will range from about 0.5 to 12% by weight of dry starch.

The amphoteric starch derivative of this invention may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical, chemiground wood, ground wood or any combination of these fibers. Fibers of the viscose rayon or regenerated cellulose type may also be used if desired.

Any desired inert mineral fillers may be added to the pulp which is to be modified with the improved amphoteric starch derivatives of this invention. Such materials include clay, titanium dioxide, talc, calcium carbonate, calcium sulfatae and diatomaceous earths.

Other addidtives commonly introduced into paper may be added to the pulp or furnish, for example, dyes, pigments, sizing additives, alum, anionic retention aids, etc..

The amount of amphoteric starch derivative that may be added to the wet end or paper pulp will be an effective additive amount, especially effective to improve drainage and filler retention. More particularly, from about 0.05 to 10% of the amphoteric starch and preferably from about 0.1 to 2% by weight, based on the dry weight of the stock or furnish, may be used. The amphoteric starch derivatives are dispersed or solubilized prior to addition to the papermaking system. This may be accomplished by standard or known techniques such as batch cooking, jet cooking or steam injection cooking.

In addition to the selected amphoteric starch derivatives and other components that may be included in the alkaline papermaking system as described above, colloidal inorganic minerals may be added to the system to form an alkaline microparticle system. Such microparticle systems may include colloidal silica or bentonite, and alum and may be incorporated into the system in amounts of at least 0.001% and more particularly from about 0.01 to 1% by weight, based on the weight of dry pulp. Further description of such microparticle materials may be found in U.S. Pat. No. 4,388,150 issued Jun. 14, 1983; U.S. Pat. No. 4,643,801 issued Feb. 17, 1987; U.S. Pat. No. 4,753,710 issued Jun. 28, 1988 and U.S. Pat. No. 4,913,775 issued Apr. 3, 1990; all of which are incorporated herein by reference.

The following examples will further illustrate the embodiments of this invention. In these examples, all parts are given by weight and all temperatures in degrees Celsius unless otherwise noted.

EXAMPLE 1

A fluid bed processed amphoteric starch was prepared as follows. One thousand (1000) g (anhydrous weight) of cationic waxy corn starch (amylopectin-2-hydroxy-3-(trimethylammonium) propyl ether chloride, commercially available from National Starch and Chemical Company) was impregnated with 20 g (2%) sodium tripolyphosphate. The starch was slurried in 2500 g of water and the slurry pH was adjusted to 6 and stirred for 30 minutes. The starch slurry was filtered (de-watered) using a Buchner funnel and a vacuum flask and 154 g of a 13% aqueous solution was poured over the filter cake. This treatment resulted in impregnated starch having 0.51% of inorganic phosphorus tarch. The impregnated starch was air dried at about 25° C. to a moisture content of about 10% and ground using a Prater mill. The heat treatment of the starch to affect the starch phosphorylation, was carried out in a fluid bed reactor using the following process conditions. First, the starch was dried at a temperature of about 104° C. (220° F.) until the moisture content was less than 1% by weightrds, the temperature was increased to 126° C. (260° F.) and the heat treatment carried out over 20 minutes. The heat treatment resulted in a level of bound phosphorus of 0.19% and the reaction efficiency was 38% (Sample A).

The above fluid bed processed amphoteric starch (Sample A) was evaluated for drainage performance and compared to a conventionally prepared amphoteric starch (amylopectin-dihydrogen phosphate-2-hydroxy-3-(trimethylammonium) propyl ether-chloride-sodium salt, commercially available from National and Chemical Company) having a bound phosphorus of 0.18% (Sample B). The comparative sample was prepared by impregnating waxy corn starch with an aqueous sodium tripolyphosphate solution using a method described in U.S. Pat. No. 4,216.310. The impregnation resulted in 0.85% of inorganic phosphorus on starch. This phosphorus usage level was significantly higher than for Sample A. After impregnation, the moisture content of the starch was about 4%. The phosphorylation reaction was carried out by heat treating the starch for about 45 minutes in a continuous cooker. The heat treatment resulted in a level of bound phosphorus of 0.18% with a reaction efficiency of 22% (Sample B). The drainage performance was determined using a dynamic drainage jar. The paper pulp which was used for this test was adjusted to a pH of 5.5. The two starch samples were water bath cooked at 1% solids and the amount of starch which was added to the paper pulp corresponded to addition levels of 8 and 20 lbs of starch per ton of paper. The results are given in Table 1 and show very similar drainage performance for samples A and B. This indicates that the fluid bed prepared amphoteric waxy corn starch is very suitable and functional as a drainage aid in the wet end of papermaking. The advantage of this fluid bed process is that it is possible to make functional amphoteric starches using a reduced amount of phosphate reagent due to improved reaction efficiency.

TABLE 1

Drainage Performance of Amphoteric Waxy Corn Starches

| | Drainage Performance | |
|---|---|---|
| Test Sample starch/ton paper | 8 lbs starch/ton paper (ml/s) | 20 lbs ml/s |
| Sample A | 98 | 234 |
| Sample B | 99 | 232 |

EXAMPLE 2

A fluid bed processed amphoteric starch was prepared as follows. A 1000 g (anhydrous weight) amount of cationic waxy corn starch (described in Example 1) was impregnated with 2% (20 g) of sodium tripolyphosphate. The starch was slurried in 2500 g of water and the slurry pH was adjusted to a level of 6 and stirred for 30 minutes. The starch slurry was filtered (de-watered) using a Buchner funnel and a vacuum flask and 154 g of a 13% aqueous sodium tripolyphosphate solution was poured over the filter cake. This treatment level resulted in 1.04% inorganic phosphorus on starch. The impregnated starch was air dried at about 25° C. to a moisture content of about 10% and ground using a Prater mill. The heat treatment of the impregnated starch, which affects the starch phosphorylation, was carried out in a fluid bed reactor using the following reaction conditions. First the starch was dried at a temperature of 104° C. (220° F.) until the moisture was less than 1%. Afterwards, the temperature was increased to 116° C. (240° F.) and the heat treatment was carried out for 100 minutes. The heat treatment resulted in a level of bound phosphorus of 0.286%. The fluid bed processed amphoteric starch (Sample C) was evaluated for drainage performance and compared to a conventionally prepared amphoteric similar to the one prepared in Example 1 (Sample D). Sample D had an impregnation of 0.72% of inorganic phosphorus on starch. After impregnation, the moisture content of the starch was about 4%. The phosphorylation reaction was carried out by heat treating the starch for about 45 minutes in a continuous cooker. The heat treatment resulted in a level of bound phosphorus of 0.168%.

The drainage performance was determined using a dynamic drainage jar. The paper pulp which was used for this test was adjusted to a pH of 5.8. The amount of starch which was added to the paper pulp corresponded to addition levels of 10 to 40 lbs starch per ton of paper. The results are given in Table 2 and showed that the use of the fluid bed processed amphoteric starch (Sample C) gave significantly improved drainage performance.

TABLE 2

Drainage Performance of Amphoteric Waxy Corn Starch

| Starch Addition | Drainage Performance (cc/sec) | |
|---|---|---|
| lbs/T | Sample C | Sample D |
| 10 | 183 | 156 |
| 20 | 234 | 176 |
| 30 | 268 | 211 |
| 40 | 259 | 217 |

EXAMPLE 3

An amphoteric waxy corn starch was prepared as follows. Cationic waxy corn starch (described in Example 1) was impregnated with an aqueous sodium tripolyphosphate solution and dried to a moisture content of about 8%. The impregnation resulted in 0.706% phosphorus on starch as determined via inductively couple plasma analysis. The starch phosphorylation was carried out in a Processall reactor under sufficient agitation to fluidized the product. After the starch was loaded into the reactor, it was agitated at about 150 rpm to obtain conditions comparable to a fluidized state. The starch was dried at a temperature of about 121° C. (250° F.) until the moisture was less than 1%. Vacuum was applied in order to improve the drying process. Once the moisture was less than 1%, the temperature was increased to a reaction of 143° C. (290° F.) and samples were taken once the temperature reached 143° C. (Sample E) and after the heat treatment was carried out for 60 minutes (Sample F). The heat treatment resulted in levels of bound phorphorus of 0.21% (Sample E) and 0.27% (Sample F). These sample (E and F) together with a comparative conventionally prepared amphoteric starch (Sample B) used in Example 1, were evaluated for drainage performance in paper pulp under acidic conditions following the procedure described in Example 1. The results are given in Table 3 and indicate that drainage performance is significantly better for Sample F over the comparative Sample B while the drainage performance of Sample E was slightly improved over the comparative Sample B.

TABLE 3

Drainage Performance of Amphoteric Waxy Corn Starch

| Starch Addition | Drainage Performance (cc/sec) | | |
|---|---|---|---|
| Lbs/ton paper | Sample E | Sample F | Sample B |
| 10 | 156 | 153 | 149 |
| 20 | 174 | 187 | 172 |
| 30 | 181 | 205 | 176 |
| 40 | 187 | 211 | 181 |

The samples described above were further evaluated for filler retention performance. The evaluation was carried out in an alkaline papermaking system using Dynamic Alkaline Retention Evaluation, Tappi 261 pm 90 in an alkaline paper system (pH 7.8). A standard papermaking furnish was prepared using a pulp stock which comprised an aqueous slurry of bleached hardwood kraft paper and bleached softwood kraft pulp. The pulp stock was refined in an aqueous solution to about 400 Canadian Standard Freeness (CSF) and a pH of 7.7 to 8.2 and contained precipitated calcium carbonate filler (30% db) with 8 to 10% fiber fines and total fines of 37 to 42%. The test was run while mixing and agitating using a Brift jar with a screen having holes 76 microns in diameter. The results are given in Table 4 below. The filler retention for Sample E was 23.6% $CaCO_3$ at a starch addition level of 10 lbs per ton of paper and increased to 57.7% $CaCO_3$ at an addition level of 40 lbs per ton of paper. Sample F also showed an increase from 23.1 to 49.9% $CaCO_3$ as the additional level was increased from 10 to 40 lbs per ton of paper. The filler retention of Sample E matched the performance of standard Sample B while that of Sample F was slightly less.

TABLE 4

Retention Performance of Amphoteric Waxy Corn Starch

| Starch Addition | Retention Performance (% $CaCO_3$) | | |
|---|---|---|---|
| Lbs/ton paper | Sample E | Sample F | Sample B |
| 10 | 23.6 | 23.1 | 28.0 |
| 20 | 40.3 | 34.1 | 42.7 |
| 30 | 49.8 | 42.3 | 49.5 |
| 40 | 57.7 | 49.5 | 57.5 |

What is claimed is:

1. A method of making paper comprising adding to the paper stock prior to or during formation of the sheet, an effective amount of an amphoteric starch which contains a cationic component and an anionic phosphate component and is made by:

a) impregnating a cationic starch with a phosphate reagent to form an impregnated starch;

b) drying the impregnated starch to a moisture content of less than 1% by weight of starch; and c) heating to phosphorylate the starch.

2. The method of claim 1 wherein the starch is waxy maize, corn, tapioca, potato starch or a combination thereof.

3. The method of claim 2 wherein the phosphate reagent is an alkali metal ortho-, pyro-, meta-, or tripolyphosphate.

4. The method of claim 3 wherein the cationic component is a tertiary amino or quaternary ammonium ether group.

5. The method of claim 1 wherein the impregnated starch is dried and phosphorylated while in the fluidized state.

6. The method of claim 5 wherein the starch is waxy maize, corn, tapioca, potato starch or a combination thereof.

7. The method of claim 6 wherein the phosphate reagent is an alkali metal ortho-, pyro-, meta-, or tripolyphosphate.

8. The method of claim 7 wherein the cationic component is a tertiary amino or quaternary ammonium ether group.

9. The method of claim 8 wherein from about 0.05 to 10% by weight of the amphoteric starch, based on the dry weight of the paper stock, is used.

10. The method of claim 9 wherein from about 0.5 to 12% by weight of phosphate reagent, based on the weight of dry starch, is used.

11. The method of claim 9 wherein the amphoteric starch contains about 0.03 to 1% of bound phosphorus.

12. The method of claim 8 wherein from about 0.1 to 2% by weight of the amphoteric starch, based on the dry weight of the paper stock is used and it contains from about 0.1 to 0.5% bound phosphorus.

13. The method of claim 12 wherein the impregnated starch is dried while in the fluidized state at a temperature of less than about 140° C.

14. The method of claim 13 wherein the temperature is from about 60 to 140° C.

15. The method of claim 12 wherein the starch is phosphorylated by heating to a temperature of between about 100 to 185° C.

16. The method of claim 14 wherein the starch is phosphorylated by heating to a temperature of between about 120 to 140° C.

17. Paper made by the method of claim 1.

18. Paper made by the method of claim 4.

19. Paper made by the method of claim 5.

20. Paper made by the method of claim 12.

21. Paper made by the method of claim 16.

* * * * *